(12) United States Patent
Lee

(10) Patent No.: US 11,362,532 B2
(45) Date of Patent: Jun. 14, 2022

(54) METHOD FOR SUPPLYING POWER AND DEVICE THEREFOR

(71) Applicant: KT&G CORPORATION, Daejeon (KR)

(72) Inventor: Moon Bong Lee, Seoul (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 16/760,227

(22) PCT Filed: Jan. 22, 2019

(86) PCT No.: PCT/KR2019/000873
§ 371 (c)(1),
(2) Date: Apr. 29, 2020

(87) PCT Pub. No.: WO2019/172525
PCT Pub. Date: Sep. 12, 2019

(65) Prior Publication Data
US 2020/0358304 A1    Nov. 12, 2020

(30) Foreign Application Priority Data

Mar. 6, 2018  (KR) .................. 10-2018-0026537

(51) Int. Cl.
*H02J 7/00* (2006.01)
*A24F 40/90* (2020.01)
(Continued)

(52) U.S. Cl.
CPC ............ *H02J 7/0068* (2013.01); *A24F 40/50* (2020.01); *A24F 40/90* (2020.01); *A24F 40/10* (2020.01)

(58) Field of Classification Search
CPC .......... H02J 7/00; H02J 7/0068; H02J 7/0048; H02J 7/0063; H02J 7/007192;
(Continued)

(56) References Cited

U.S. PATENT DOCUMENTS 8,486,547 B2 *  7/2013  Yajima ................ H01M 10/425
                                                    429/61
8,862,907 B2    10/2014  Furusho et al.
(Continued)

FOREIGN PATENT DOCUMENTS

CN    101969800 A    2/2011
CN    106455721 A    2/2017
(Continued)

OTHER PUBLICATIONS

Korean Office Action for 10-2018-0026537 dated Jan. 10, 2020.
(Continued)

*Primary Examiner* — Helen Rossoshek
(74) *Attorney, Agent, or Firm* — Sughrue Mion, PLLC

(57) ABSTRACT

Provided is a device including: a battery; a receiving terminal configured to receive power from an external device; a first path configured to supply a portion of the power received from the external device to the battery to charge the battery; and a second path configured to supply a portion of the power received from the external device to a heater to heat the heater.

3 Claims, 9 Drawing Sheets

(51) Int. Cl.
*A24F 40/50* (2020.01)
*A24F 40/10* (2020.01)

(58) Field of Classification Search
CPC .............. H02J 2207/10; H02J 2310/22; H02J 7/00309; Y02E 60/10; A24F 40/10; A24F 40/50; A24F 40/90; A24F 40/57; A24F 40/60

See application file for complete search history.

(56) References Cited

U.S. PATENT DOCUMENTS

| | | | |
|---|---|---|---|
| 9,439,454 | B2 | 9/2016 | Fernando et al. |
| 9,532,604 | B2* | 1/2017 | Conley ................. A61M 15/06 |
| 9,825,478 | B2 | 11/2017 | Odaohhara et al. |
| 9,923,368 | B2 | 3/2018 | Park et al. |
| 9,997,933 | B2* | 6/2018 | Huang .................. H02J 7/0029 |
| 10,090,693 | B2 | 10/2018 | Alarcon |
| 10,201,186 | B2 | 2/2019 | Alarcon et al. |
| 10,276,898 | B2 | 4/2019 | Leadley |
| 10,827,655 | B2* | 11/2020 | Truettner ............. H02J 7/00309 |
| 10,894,520 | B2* | 1/2021 | Nakayama ............ B60R 16/033 |
| 10,971,942 | B2* | 4/2021 | Jung ......................... H02J 7/00 |
| 10,994,353 | B2* | 5/2021 | Lemay .................... B23K 1/19 |
| 11,006,671 | B2* | 5/2021 | Li ............................ A24F 47/00 |
| 2004/0149297 | A1 | 8/2004 | Sharpe |
| 2011/0307732 | A1 | 12/2011 | Furusho et al. |
| 2014/0363145 | A1 | 12/2014 | Plojoux et al. |
| 2015/0201676 | A1 | 7/2015 | Shin |
| 2017/0215484 | A1* | 8/2017 | Xiang .................. H01M 10/44 |
| 2017/0250552 | A1 | 8/2017 | Liu |
| 2017/0303597 | A1 | 10/2017 | Tsui |
| 2017/0332702 | A1* | 11/2017 | Cameron ............ A24B 15/167 |
| 2017/0367405 | A1* | 12/2017 | Zhu ........................ A24F 40/42 |
| 2018/0020728 | A1* | 1/2018 | Alarcon ................. A24F 40/51 392/404 |
| 2018/0027878 | A1 | 2/2018 | Dendy et al. |
| 2018/0042299 | A1* | 2/2018 | Han ........................ A24F 40/30 |
| 2018/0192700 | A1* | 7/2018 | Fraser .................. A24F 40/465 |
| 2019/0000143 | A1* | 1/2019 | Zhu ....................... A24F 40/485 |
| 2019/0380392 | A1 | 12/2019 | Fernando et al. |
| 2020/0000149 | A1* | 1/2020 | Rothwell ................. H05B 3/12 |
| 2020/0015523 | A1* | 1/2020 | Ouyang ................. A61M 15/06 |
| 2020/0120988 | A1* | 4/2020 | Qiu ......................... A24F 40/57 |
| 2021/0274843 | A1* | 9/2021 | Trzecieski ............. A24F 40/46 |

FOREIGN PATENT DOCUMENTS

| | | | | |
|---|---|---|---|---|
| CN | 106575877 | A | | 4/2017 |
| CN | 106998808 | A | | 8/2017 |
| CN | 211482968 | U | * | 9/2020 |
| EP | 3326473 | A1 | * | 5/2018 ............ H02J 7/0045 |
| JP | 2011-87569 | A | | 5/2011 |
| JP | 2011-259625 | A | | 12/2011 |
| JP | 2013-162745 | A | | 8/2013 |
| JP | 2015-504669 | A | | 2/2015 |
| JP | 2015-208188 | A | | 11/2015 |
| JP | 2019216731 | A | * | 12/2019 ............... H05B 3/44 |
| KR | 10-2007-0071759 | A | | 7/2007 |
| KR | 10-2011-0084388 | A | | 7/2011 |
| KR | 10-1383577 | B1 | | 4/2014 |
| KR | 10-2014-0109455 | A | | 9/2014 |
| KR | 101570876 | B1 | * | 11/2015 |
| KR | 10-1680909 | B1 | | 11/2016 |
| WO | 2015/175713 | A1 | | 11/2015 |

OTHER PUBLICATIONS

International Search Report for PCT/KR2019/000873 dated Apr. 26, 2019 (PCT/ISA/210).
Communication dated Jun. 22, 2021 by the Japanese Patent Office in application No. 2020-526605.
Office Action dated Dec. 13, 2021 in Chinese Application No. 201980003587.2.
Extended European Search Report dated Oct. 20, 2021 in European Application No. 19763304.3.
Office Action dated Dec. 21, 2021 in Japanese Application No. 2020-526605.

* cited by examiner

METHOD FOR SUPPLYING POWER AND DEVICE THEREFOR

CROSS REFERENCE TO RELATED APPLICATIONS

This application is a National Stage of International Application No. PCT/KR2019/000873 filed Jan. 22, 2019, claiming priority based on Korean Patent Application No. 10-2018-0026537 filed Mar. 6, 2018.

TECHNICAL FIELD

Disclosed are a method for supplying power to a power-consuming module of a device and the device.

BACKGROUND ART

Use of a device including a battery and various modules is rapidly growing. In particular, a device, which includes a battery and a heater, frequently has high power consumption due to characteristics of the heater.

Generally, a device including a battery and one or more modules should be implemented to enable charging during various operations of the device. However, no specifics have been disclosed about a power supplying method that enables charging during various operations of a device.

DESCRIPTION OF EMBODIMENTS

Technical Problem

The present disclosure provides a method of supplying power to a heater or a battery included in a device, and the device. In detail, a specific power supplying method enabling charging during various operations of the device is disclosed. The technical problems to be solved by the present disclosure are not limited to the above, and there may be other technical problems.

Solution to Problem

A device including a battery, according to a first aspect, may include: a receiving terminal configured to receive power from an external device; a first path configured to supply a portion of the power received from the external device to a battery included in the device to charge the battery; and a second path configured to supply a portion of the power received from the external device to a module included in the device.

Also, the device may further include a processor configured to control supply of power received from the external device, such that charging of the battery and heating of the heater are simultaneously performed.

Also, when supplying power to the battery, the processor may block a third path used in supplying power from the battery to the heater.

Also, the heater may perform heated cleaning by using the power received via the second path.

Also, a device including a battery, according to a second aspect, may include: a receiving terminal configured to receive power from an external device; a first path configured to supply all or a portion of the power received from the external device to a battery included in the device to charge the battery, based on an amount of power received from the external device per hour; and a second path configured to supply a portion of the power received from the external device, to a heater, to heat the heater, when the amount of power received per hour is equal to or greater than a preset value.

Also, the device may further include a processor configured to control supply of the power received from the external device, such that, when the amount of power received per hour is equal to or greater than the preset value, a portion of the power received from the external device is supplied to the battery via the first path to charge the battery, and when the amount of power received per hour is less than the preset value, all of the power received from the external device is supplied to the battery via the first path to charge the battery.

Also, a device including a battery, according to a third aspect, may include: a receiving terminal configured to receive power from an external device; a first path configured to supply a portion of power received from the external device to a battery included in the device to charge the battery, when remaining power of the battery is equal to or less than a preset value; and a second path configured to supply all of the power received from the external device to a heater to heat the heater, when remaining power of the battery exceeds the preset value.

Also, a method of charging a battery included in a device, according to a fourth aspect, may include: receiving power from an external device; charging the battery by supplying a portion of the received power to the battery via a first path; and heating a heater by supplying a portion of the received power to the heater via a second path.

Also, a method of charging a battery included in a device, according to a fifth aspect, may include: receiving power from an external device; charging the battery by supplying all or a portion of the received power to the battery via a first path based on an amount of the power received per hour; and heating a heater by supplying a portion of the received power to the heater via a second path when an amount of the power received per hour is equal to or greater than a preset value.

Also, according to a sixth aspect, a computer-readable recording medium having recorded thereon a program for executing the method, according to the fourth aspect and the fifth aspect, on a computer may be provided.

Advantageous Effects of Disclosure

A specific power supplying method enabling charging during various operations of a device is provided.

BEST MODE

A device including a battery, according to a first aspect, may include: a receiving terminal configured to receive power from an external device; a first path configured to supply a portion of the power received from the external device to a battery included in the device to charge the battery; and a second path configured to supply a portion of the power received from the external device to a module included in the device.

MODE OF DISCLOSURE

The terms used in the embodiments are those general terms currently widely used in the art in consideration of functions in regard to the present disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the present disclosure should be understood not as simple names but based on the meaning of the terms and the overall description of the present disclosure.

Throughout the specification, when a portion "includes" an element, another element may be further included, rather than excluding the existence of the other element, unless otherwise described. In addition, the terms "-unit," "module," etc. described in the specification mean units for processing at least one function or operation and can be implemented by hardware components or software components or combinations thereof.

Hereinafter, the present disclosure will now be described more fully with reference to the accompanying drawings, in which embodiments of the present disclosure are shown such that one of ordinary skill in the art may easily work the present disclosure. The present disclosure can, however, be embodied in many different forms and should not be construed as being limited to the embodiments set forth herein.

Figure 1:
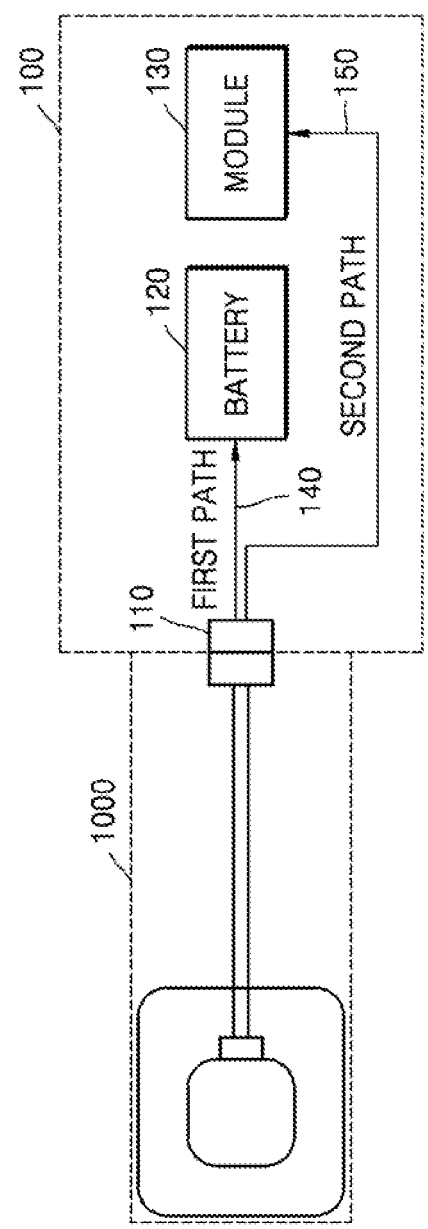
FIG. 1 is a block diagram illustrating an example of a device including a plurality of paths, according to an embodiment.

FIG. 1 is a block diagram illustrating an example of a device 100 including a plurality of paths, according to an embodiment. As illustrated in FIG. 1, the device 100 may include a receiving terminal 110, a battery 120, a module 130, a first path 140, and a second path 150. Alternatively, a device according to another example may further include a processor (illustrated in FIG. 2).

However, it will be understood by one of ordinary skill in the art that other general-purpose components may be further included in the device 100, in addition to the components illustrated in FIG. 1. Alternatively, it will be obvious to one of ordinary skill in the art that some of the components illustrated in FIG. 1 may be omitted according to another embodiment.

The device 100 according to an embodiment may receive power from an external device 1000. The external device 1000 may be a device supplying power to the device 100 and may be of various types. The external device 1000 may supply a preset form of power to the device 100. For example, the external device 1000 may be a device supplying power according to a Universal Serial Bus (USB) standard (e.g., USB 1.0, USB 2.0, USB 3.0, etc.). As another example, the external device 1000 may be a cradle, and in this case, the external device 1000 may supply power to the device 100 according to other preset standards than USB.

The device 100 according to an embodiment may receive power from the external device 1000 through the receiving terminal 110. The receiving terminal 110 according to an embodiment may include a plurality of lines and may receive a preset form of power (e.g., direct current or alternating current).

Unlike FIG. 1, the device 100 may wirelessly receive power from the external device 1000. In this case, the receiving terminal 110 may function as a wireless power receiving terminal that wirelessly receives power.

The receiving terminal 110 according to an embodiment may be attached to the battery 120 or the module 130. Also, the device 100 according to an embodiment may include one or more receiving terminals 110. For example, a first receiving terminal may be attached to the battery 120, and a second receiving terminal may be attached to the module 130.

The receiving terminal 110 according to an embodiment may supply power to the battery 120 via the first path 140 and supply power to the module 130 via the second path 150. While only one module 130 is disclosed in FIG. 1 according to an embodiment, the device 100 may include one or more modules 130.

The first path 140 and the second path 150 may operate independently of each other. For example, the first path 140 and the second path 150 may respectively and simultaneously supply power to the battery 120 and the module 130. In another embodiment, only one of the first path 140 and the second path 150 may supply power to the battery 120 or the module 130. As an example, when power (for example, current) supplied from the external device 1000 per unit time is equal to or less than a preset value, only one of the first path 140 and the second path 150 may be activated. For example, when power (for example, current) supplied from the external device 1000 per unit time is equal to or less than a preset value, only the first path 140 may be activated to charge the battery 120. Alternatively, when power (for example, current) supplied from the external device 1000 per unit time is equal to or less than a preset value, only the second path 150 may be activated so the module 130 may operate. When power (for example, current) supplied from the external device 1000 per unit time exceeds a preset value, both the first path 140 and the second path 150 may be activated and charge the battery 120 while operations of the module 130 are simultaneously performed. Accordingly, the device 100 may also be used during charging without the risk of overheating or explosion of the battery 120. A user may immediately use the device 100 without having to wait until charging is completed to some extent. Also, charging time may be shortened.

The battery 120 according to an embodiment may supply power to one or more modules 130 included in the device 100. For example, the device 100 may supply power to a heater (shown in FIG. 2) of the device 100.

The battery 120 according to an example may supply power to one or more modules 130. For example, the battery 120 may supply power to one or more modules 130 in the form of direct current or alternating current.

The battery 120 according to an example may be charged using power received from the first path 140. For example, the battery 120 according to an example may be charged using power provided in the form of direct current or alternating current, through the first path 140.

The battery 120 according to an embodiment may be charged using a wireless charging method. When the battery 120 is charged using a wireless charging method, the first path 140 may be omitted.

The module 130 according to an embodiment may implement one or more functions of the device 100. For example, the module 130 may include a device that consumes power per hour more than a preset value. As another example, the module 130 may include an electronic device operating using power regardless of power consumption per hour. The present disclosure may also apply to electronic devices consuming small power regardless of power consumption or power consumption per hour. According to an embodiment, when the receiving terminal 110 receives power, regardless of power consumption of the module 130, the module 130 receives power not from the battery 120, but directly from the receiving terminal 110, which may reduce the risk of overheating of the battery 120, over-power consumption of the battery 120, explosion of the battery 120, or the like.

For example, regardless of power consumption of the module 130, as power is supplied from the receiving terminal 110 directly to the module 130 and without passing through the battery 120, compared to when power is consumed from the battery 120 after charging the battery 120, the lifetime of the battery 120 may be extended. Also, the present disclosure may be applied to mobile phones, external battery packs, or laptop computers.

As another example, the module 130 may include a device consuming power per hour equal to or greater than a preset value. For example, the module 130 may be a heater. The heater may convert power received via the second path 150, into thermal energy. An operation of the heater will be described in detail below with reference to FIG. 2.

Figure 2:
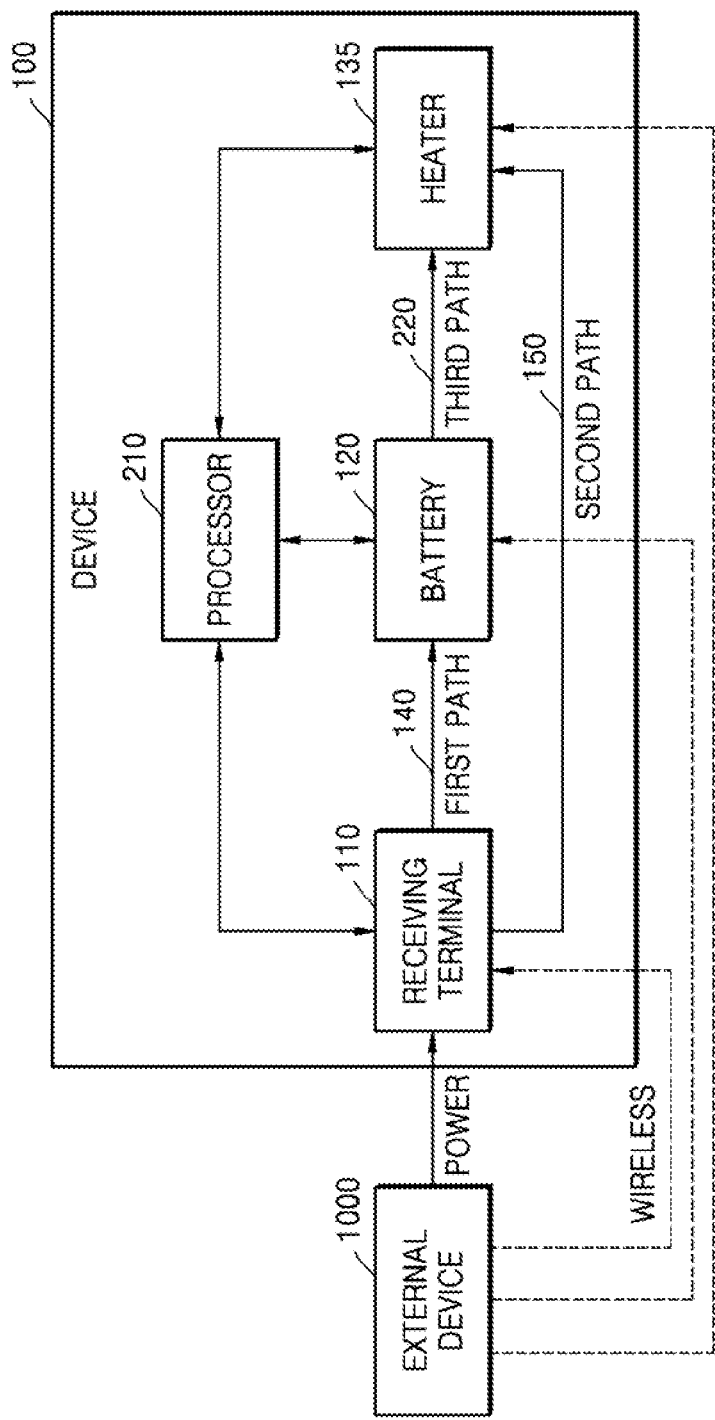
FIG. 2 is a block diagram illustrating an example of a device receiving power from an external device, according to an embodiment.

FIG. 2 is a block diagram illustrating an example of a device 100 receiving power from an external device 1000, according to an embodiment.

As illustrated in FIG. 2, the device 100 may include a receiving terminal 110, a battery 120, a heater 135, a first path 140, a second path 150, and a processor 210.

However, it will be understood by one of ordinary skill in the art that other general-purpose components may be further included in the device 100, in addition to the components illustrated in FIG. 2. Also, it will be understood by one of ordinary skill in the art that some of the components illustrated in FIG. 2 may be omitted according to another embodiment.

The receiving terminal 110 according to an embodiment may receive power from the external device 1000.

The receiving terminal 110 according to an embodiment may receive power in a preset form (e.g., voltage, current, power level, etc. within a preset range) from the external device 1000. Also, the receiving terminal 110 may be compatible (e.g., 5-pin, 8-pin, etc.) with an output terminal of the external device 1000.

When the device 100 according to an embodiment wirelessly receives power from the external device 1000, the receiving terminal 110 may be omitted. Alternatively, when the device 100 wirelessly receives power from the external device 1000, the receiving terminal 110 may function as a wireless power receiving terminal wirelessly receiving power transmitted from the external device 1000.

The receiving terminal 110 according to an embodiment may supply power to the battery 120 via a first path 140 and supply power to the heater 135 via a second path 150.

The first path 140 according to an embodiment may supply a portion of power received from the external device 1000, to the battery 120 to charge the battery 120. Alternatively, in order to charge the battery 120, the first path 140 according to an embodiment may supply, to the battery 120, all or a portion of power received from the external device 1000 according to an amount of power (e.g., current, power, etc.) received from the external device 1000 per unit time.

For example, a preset percentage of power applied to the receiving terminal 110 may be supplied to the battery 120 via the first path 140. For example, 70% to 80% of power applied to the receiving terminal 110 may be supplied to the battery 120, but an embodiment is not limited thereto.

As another example, a preset amount of power from power applied to the receiving terminal 110 may be supplied to the battery 120 via the first path 140. For example, a[w] from power applied to the receiving terminal 110 may be supplied to the battery 120. When power applied to the receiving terminal 110 is less than a[w], the power applied to the receiving terminal 110 may be entirely supplied to the battery 120.

As another example, power applied to the receiving terminal 110, after subtracting a preset amount of power, may be supplied to the battery 120 via the first path 140. For example, after subtracting b[w] from power applied to the receiving terminal 110, the remaining power may be supplied to the battery 120. When power applied to the receiving terminal 110 is less than b[w], power supplied to the battery 120 via the first path 140 may be 0.

In order to heat the heater 135, the second path 150 according to an embodiment may supply all or a portion of power received from the external device 1000, to the heater 135.

For example, a preset percentage of power applied to the receiving terminal 110 may be supplied to the heater 135 via the second path 150. For example, 70% to 80% of power applied to the receiving terminal 110 may be supplied to the heater 135, but an embodiment is not limited thereto.

As another example, a preset amount of power from power supplied to the receiving terminal 110 may be supplied to the heater 135 via the second path 150. For example, c[w] of power from power applied to the receiving terminal 110 may be supplied to the heater 135. When power applied to the receiving terminal 110 is less than c[w], power applied to the receiving terminal 110 may be entirely supplied to the heater 135.

As another example, remaining power after subtracting a preset amount of power from power applied to the receiving terminal 110 may be supplied to the heater 135 via the second path 150. For example, d[w] from power applied to the receiving terminal 110 may be supplied to the heater 135. When power applied to the receiving terminal 110 is less than d[w], power supplied to the heater 135 via the second path 150 may be 0.

The processor 210 according to an embodiment may control supply of power received from the external device 1000 such that charging of the battery 120 and heating of the heater 135 are simultaneously performed. The processor 210 may control the receiving terminal 110 such that power is supplied to the battery 120 via the first path 140 and power is supplied to the heater 135 via the second path 150. Thereby, charging of the battery 120 and heating of the heater 135 may be performed simultaneously. A ratio between power supplied to the battery 120 and power supplied to the heater 135 may be determined according to circumstances.

For example, when power applied to the receiving terminal 110 is equal to or less than a preset value, the processor 210 may control the receiving terminal 110 such that power is supplied first to the battery 120.

As another example, when power applied to the receiving terminal 110 is equal to or less than a preset value, the processor 210 may control the receiving terminal 110 such that power is supplied first to the heater 135.

As another example, when power supplied to the receiving terminal 110 is equal to or less than a preset value, the processor 210 may determine an object to which power is to be first supplied, based on remaining power of the battery 120. For example, when remaining power of the battery 120 is equal to or less than a preset value, the processor 210 may control the receiving terminal 110 to supply power first to the battery 120. Otherwise; when remaining power of the battery 120 exceeds a preset value, the processor 210 may control the receiving terminal 110 to supply power first to the heater 135.

As another example, when power supplied to the receiving terminal 110 is equal to or less than a preset value, the processor 210 may determine an object to which power is to be first supplied, based on a user input. For example, when the user is operating the heater 135, the processor 210 may control the receiving terminal 110 to supply power first to the heater 135.

When it is determined to supply power first to the heater 135 according to an embodiment, the processor 210 may control the receiving terminal 110 to supply power to the battery 120 only when remaining power of the battery 120 is equal to or less than a preset value. When remaining power of the battery 120 is equal to or less than a preset value, the first path 140 according to an embodiment may supply a portion of power received from the external device 1000, to the battery 120 to charge the battery 120. Also, when remaining power of the battery 120 exceeds a preset value, the second path 150 according to an embodiment may supply all of power received from the external device 1000 to the heater 135, to heat the heater 135.

When it is determined to supply power first to the battery 120 according to an embodiment, the processor 210 may control the receiving terminal 110 to control power supply such that power is supplied to the heater 135 only when a particular user input is made. Without such user input, only the battery 120 is charged without supplying power to the heater 135.

According to an embodiment, as charging of the battery 120 and heating of the heater 135 may be simultaneously performed, even during charging, a device (e.g., an electronic cigarette) may be used without stopping charging, thereby providing convenience and reducing the total charging time. Also, functions of the device 100 (e.g., heated cleaning) may be performed using sufficient power supplied from the external device 1000 even during charging, thereby improving user convenience. Also, when performing a function of the device 100 (e.g., heated cleaning) by using power of the external device 1000, power consumed from the battery 120 to perform the function of the device 100 (e.g., heated cleaning) may be reduced.

Also, when low-level power is required according to a type of function of the device 100 (e.g., heated cleaning), a level of power for charging the battery 120 may be increased in comparison. For example, when the device 100 performs heated cleaning several times and low-level power is used for initial heated cleaning, during the initial heated cleaning, charging of the battery 120 may be quickly performed.

When supplying power to the battery 120, the processor 210 according to an embodiment may block a third path 220 used to supply power from the battery 120 to the heater 135.

The third path 220 according to an embodiment may refer to a power supply path used in providing power from the battery 120 to the heater 135. When power is supplied to the battery 120, the processor 210 according to an embodiment may block the third path 220 used in supplying power from the battery 120 to the heater 135 to prevent charging of the battery 120, thereby preventing problems (e.g., instability) that may occur when power supply from the battery 120 to the heater 135 and charging of the battery 120 are simultaneously performed. For example, by blocking the third path 220, the risk of overheating or explosion of the battery 120 or over-power consumption of the battery 120 or the like may be prevented.

When the battery 120 is being charged, the processor 210 according to an embodiment may control power to be supplied to the battery 120 and the heater 135 respectively through the first path 140 and the second path 150, and block the third path 220, so that power is not supplied from the battery 120 to the heater 135 while charging of the battery 120 and heating of the heater 135 are simultaneously performed.

The heater 135 according to an embodiment may be heated by using power received via the second path 150.

For example, the heater 135 may generate aerosol by heating a cigarette attached to the heater 135 by using power received via the second path 150. As another example, the heater 135 may perform heated cleaning by using power received via the second path 150. In detail, the heater 135 according to an example may remove foreign substances attached to the heater 135, through heating. As another example, the heater 135 may generate aerosol by heating a material adjacent to the heater 135 by using power received via the second path 150.

Alternatively, the device 100 according to an embodiment may supply, to the battery 120 or the heater 135, all or a portion of power received from the external device 1000 according to an amount of power (e.g., power, current, etc.) received from the external device 1000 per unit time.

For example, the processor 210 may give priority to charging of the battery 120. For example, when an amount of power (e.g., power, current, etc.) received from the external device 1000 per unit time is equal to or greater than a preset value, the second path 150 may supply a portion of the power received from the external device 1000 to the heater 135 in order to heat the heater 135. As another example, when an amount of power (e.g., power, current, etc.) received from the external device 1000 per unit time is less than a preset value, the first path 140 may supply all of power received from the external device 1000 to the battery 120, in order to charge the battery 120.

Alternatively, as another example, the processor 210 may give priority to heating of the heater 135. For example, when an amount of power (e.g., power, current, etc.) received from the external device 1000 per unit time is equal to or greater than a preset value, to charge the battery 120, the first path 140 may supply a portion of the power received from the external device 1000 to the battery 120. As another example, when an amount of power (e.g., power, current, etc.) received from the external device 1000 per unit time is less than a preset value, the second path 150 may supply all of the power received from the external device 1000 to the heater 135, in order to heat the heater 135.

The processor 210 according to an embodiment may control power supply based on remaining power of the battery 120. For example, the processor 210 may only perform heating of the heater 135 when remaining power of the battery 120 is sufficient. In detail, when remaining power of the battery 120 is equal to or less than a preset value, the first path 140 may supply a portion of power received from the external device 1000, to the battery 120. Alternatively, when remaining power of the battery 120 exceeds a preset value, to heat the heater 135, the second path 150 according to an embodiment may supply all of power received from the external device 1000, to the heater 135.

The device 100 according to an embodiment may wirelessly receive power from the external device 1000.

For example, the battery 120 may wirelessly receive power from the external device 1000. When power is wirelessly transmitted, the power may be transmitted in an alternating current manner. Thus, the battery 120 may be charged by receiving power from the external device 1000 in a wireless and alternating current manner. The battery 120 may supply power to the heater 135 through the third path 220 according to a preset form (e.g., direct current, alternating current). However, as described above, the third path 220 may be blocked according to circumstances.

As another example, the heater 135 may wirelessly receive power from the external device 1000. When power is wirelessly transmitted, the power may be transmitted in an alternating current manner. Thus, the heater 135 may perform heating by receiving power from the external device 1000 in a wireless and alternating current manner. The heater 135 may increase a temperature of the heater 135 by using power in a preset form (e.g., direct current, alternating current). In this case, as the heater 135 receives power directly from the external device 1000, the heater 135 may operate without power supplied from the battery 120.

The device 100 according to an embodiment may receive power in an alternating current form, from the external device 1000, in a wireless or wired manner. When the device 100 receives power in an alternating current form, the power in the alternating current form may be used without conversion. When performing an operation by using power in an alternating current form by receiving the power in the alternating current form, energy efficiency may be increased. As a process of converting power in an alternating current form to power in a direct current form or a process of converting power in a direct current form to power in an alternating current form is omitted by using power in an alternating current form by using the power in an alternating current form, the energy efficiency may be increased.

For example, the heater 135 included in the device 100 may receive power in an alternating current form and perform a heating operation by using the power in an alternating current form. In this case, as a process of converting the power in an alternating current form to power in a direct current form may be omitted, the heater 135 may operate at a higher efficiency.

Power in an alternating current form may be used more efficiently in a wireless charging method. Thus, the device 100 according to an embodiment may receive power in an alternating current form by using a wireless charging method and perform a preset operation (e.g., heating the heater 135) by using the power in an alternating current form.

Figure 3:
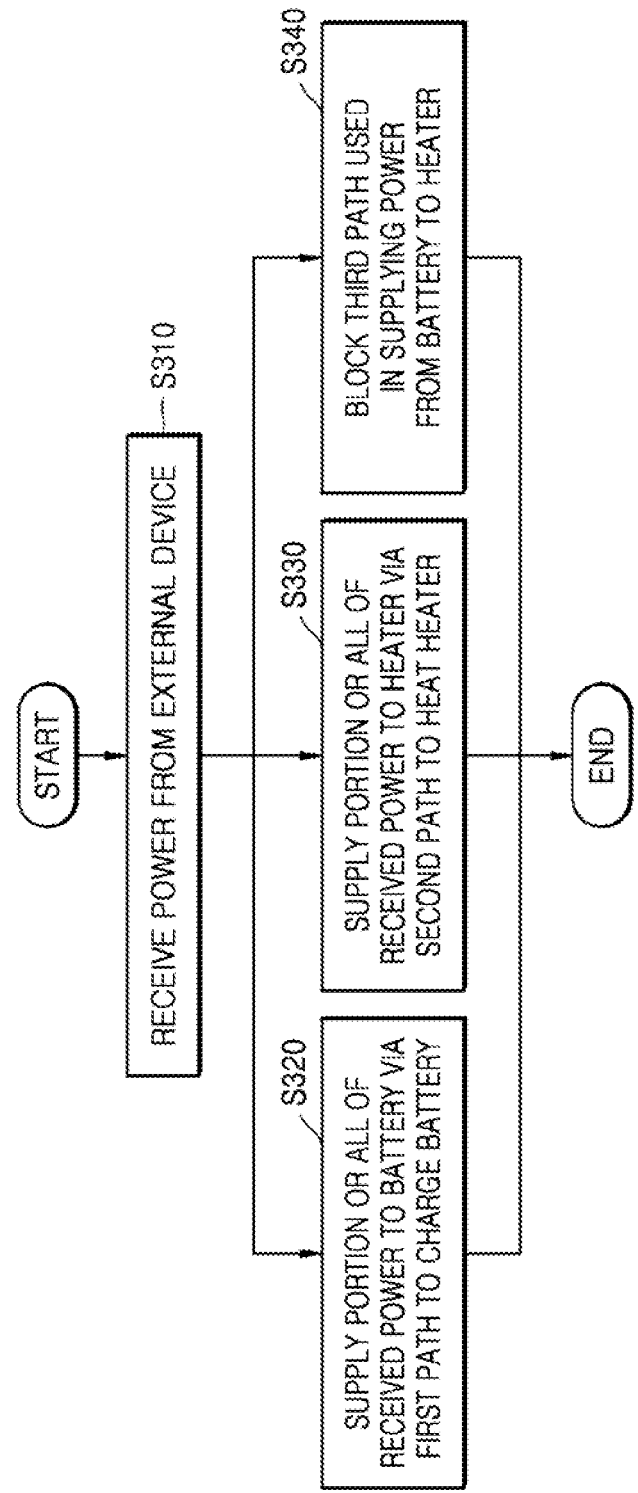
FIG. 3 is a flowchart of an example in which a device including a battery charges the battery by receiving power from an external device, according to an embodiment.

FIG. 3 is a flowchart of an example in which the device 100 including the battery 120, according to an embodiment, charges the battery 120 by receiving power from the external device 1000. In descriptions of FIG. 3, the description of FIGS. 1 and 2 provided above may be referred to.

In operation S310, the device 100 according to an embodiment may receive power from the external device 1000.

The device 100 according to an embodiment may receive power in a preset form (e.g., voltage, current, power level, etc. within a preset range) from the external device 1000. Also, the receiving terminal 110 used in receiving power from the external device 1000 may be compatible with an output terminal of the external device 1000 (e.g., 5-pin, 8-pin, etc.), and the device 100 may receive power from the external device 1000 in a wireless or wired manner.

In operation S320, the device 100 according to an embodiment may supply a portion or all of power received in operation S310, to the battery 120 via the first path 140, to charge the battery 120.

The first path 140 according to an embodiment may supply a portion of power received from the external device 1000, to the battery 120 to charge the battery 120. Alternatively, to charge the battery 120, the first path 140 according to an embodiment may supply, to the battery 120, all or a portion of power received from the external device 1000 according to an amount of power (e.g., current, power, etc.) received from the external device 1000 per unit time.

In operation S330, the device 100 according to an embodiment may supply a portion or all of power received in operation S310, to the heater 135 via the second path 150, to heat the heater 135.

The second path 150 according to an embodiment may supply all or a portion of power received from the external device 1000 to the heater 135, to heat the heater 135.

The device 100 according to an embodiment may heat the heater 135 by supplying, to the heater 135, all or a portion of power received from the external device 1000 according to an amount of power (e.g., current, power, etc.) received from the external device 1000 per unit time, remaining battery power, a user input, or the like.

In operation S340, the device 100 according to an embodiment may block the third path 220 used in supplying power from the battery 120 to the heater 135.

The third path 220 according to an embodiment may refer to a power supply path used in providing power from the battery 120 to the heater 135. When power is supplied to the battery 120, the processor 210 according to an embodiment may block the third path 220 used in supplying power from the battery 120 to the heater 135 to prevent charging of the battery 120, thereby preventing problems (e.g., instability) that may occur when power supply from the battery 120 to the heater 135 and charging of the battery 120 are simultaneously performed.

When the battery 120 is being charged, the processor 210 according to an embodiment may control power to be supplied to the battery 120 and the heater 135 through the first path 140 and the second path 150, respectively, and may block the third path 220, so that power is not supplied from the battery 120 to the heater 135 while charging of the battery 120 and heating of the heater 135 are simultaneously performed.

Operations S320, S330, and S340 described above may be performed in a different order, and each operation may be performed independently of each other.

Figure 4:
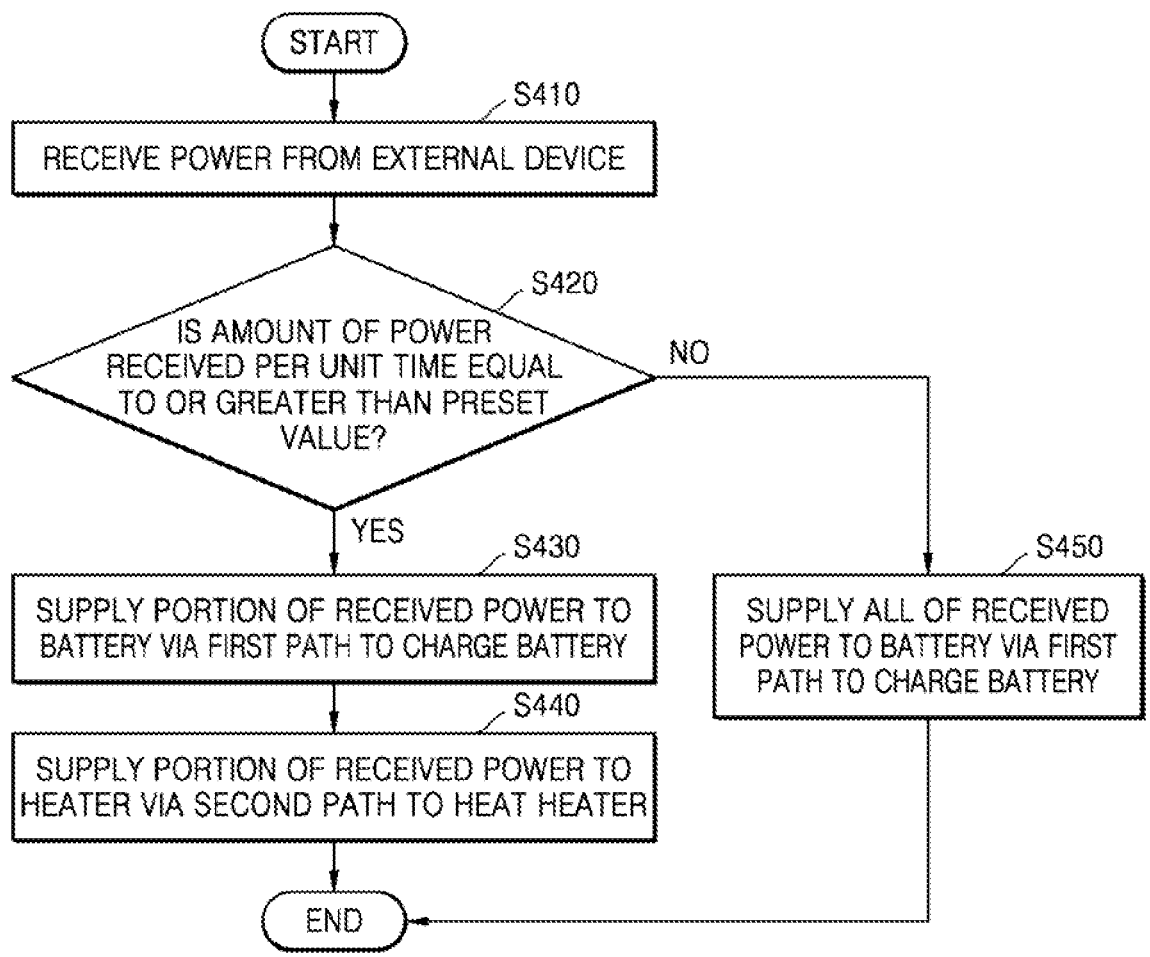
FIG. 4 is a flowchart of an example in which a device including a battery charges the battery based on an amount of power received per hour, according to an embodiment.

FIG. 4 is a flowchart of an example in which the device 100 including the battery 120 charges the battery 120 based on an amount of power received per unit time, according to an embodiment.

Operation S410 corresponds to operation S310 described above, and thus detailed description thereof will be omitted to simplify the overall description.

In operation S420, the device 100 according to an embodiment determines whether an amount of power (e.g., power, current, etc.) received per unit time is equal to or greater than a preset value. For example, when a voltage is a preset value, the device 100 may determine whether the magnitude of current is equal to or greater than a preset value.

When an amount of power received per unit time, in operation S410, is equal to or greater than a preset value, in operation S430, the device 100 may supply a portion of the power received in operation S410 to the battery 120 via the first path 140 to charge the battery 120. In operation S440, the device 100 may supply a portion of the power received in operation S410 to the heater 135 via the second path 150 to heat the heater 135. The order of operation S430 and operation S440 may be changed, and each operation may be controlled by the processor 210 to be independently performed.

When an amount of power received per unit time in operation S410 is less than a preset value, in operation S450, the device 100 according to an embodiment supplies all of the power received in operation S410 to the battery 120 via the first path 140 to charge the battery 120. While all of the power received in operation S410 is used in charging of the battery 120, when the amount of power received per unit time in operation S410 is less than a preset value, heating of the heater 135 may not be performed.

Figure 5:
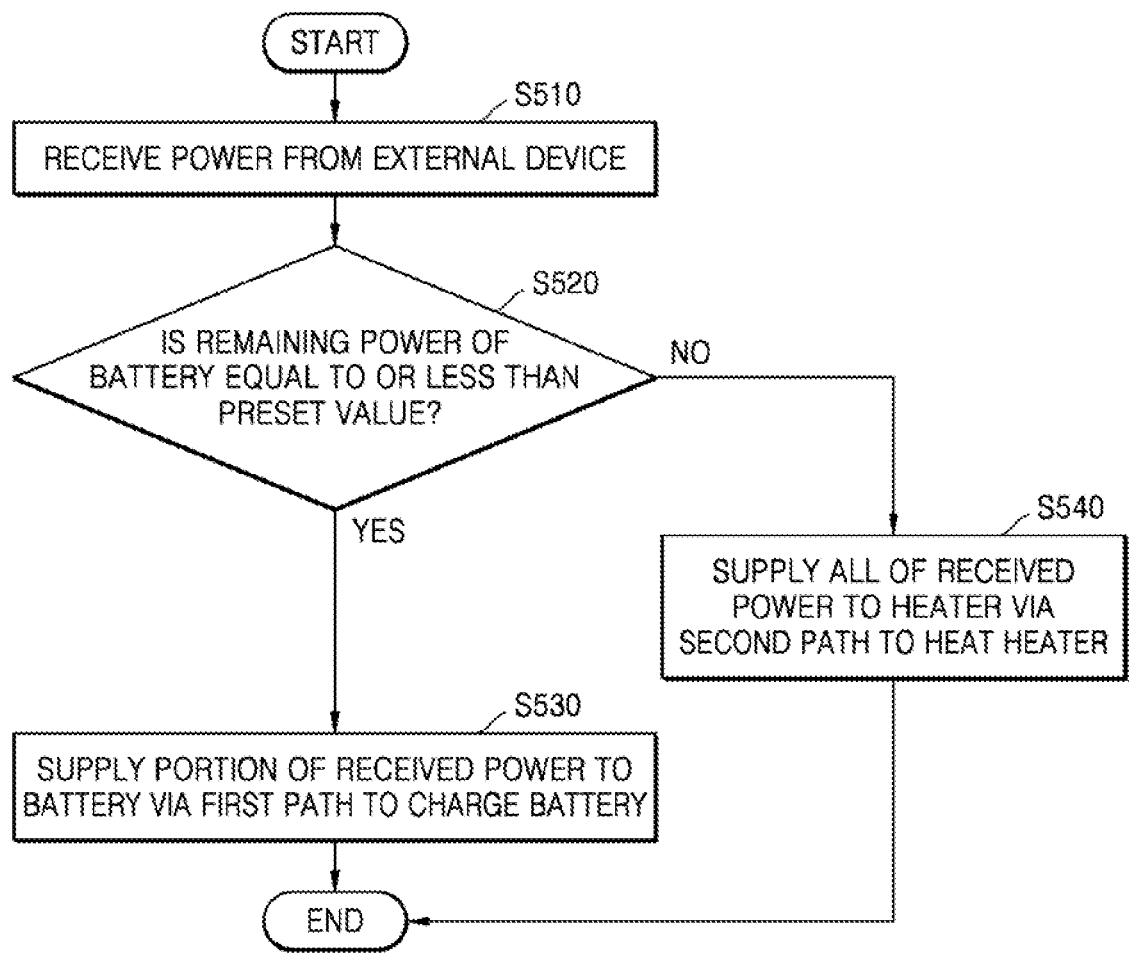
FIG. 5 is a flowchart of an example in which a device including a battery charges the battery or a heater based on remaining battery power, according to an embodiment.

FIG. 5 is a flowchart of an example in which the device 100 including the battery 120 charges the battery 120 or heats the heater 135 based on remaining battery power, according to an embodiment.

Operation S510 corresponds to operation S310 described above, and thus detailed description thereof will be omitted to simplify the overall description.

In operation S520, the device 100 according to an embodiment determines whether remaining power of the battery 120 is equal to or less than a preset value. For example, the device 100 may determine whether remaining power of the battery 120 is equal to or less than a preset value based on whether an output voltage of the battery 120 is equal to or less than a preset value, but an embodiment is not limited thereto.

When remaining power of the battery 120 is equal to or less than a preset value, in operation S530, the device 100 according to an embodiment supplies a portion of power received in operation S510 to the battery 120 via the first path 140 to charge the battery 120. As only a portion of the power received in operation S510 is used in charging the battery 120, heating of the heater 135 may be simultaneously performed at the same time the battery 120 is charged.

When remaining power of the battery 120 exceeds a preset value, in operation S540, the device 100 according to an embodiment supplies all of the power received in operation S510 to the heater 135 to charge the heater 135 via the second path 150. In this case, since all of the power received in operation S510 is supplied to the heater 135, charging of the battery 120 may not be performed.

Figure 6:
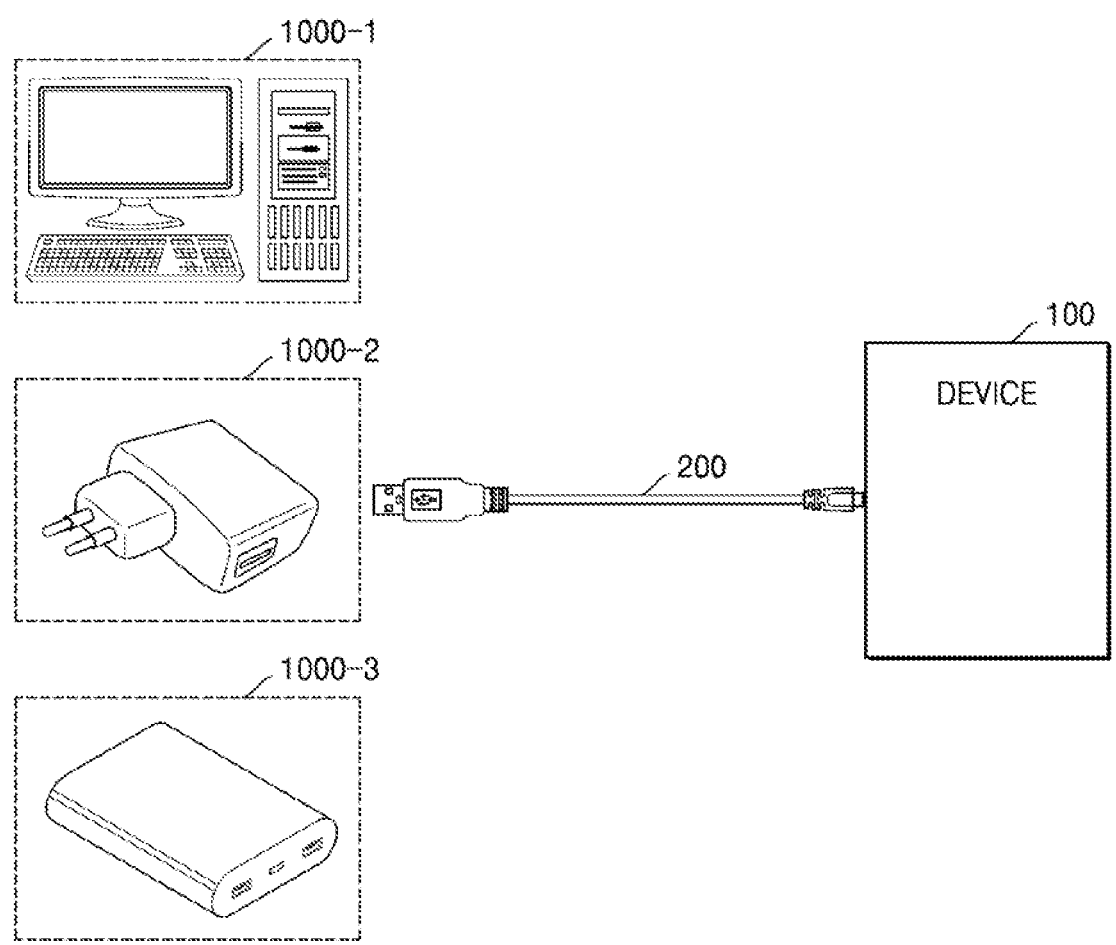
FIG. 6 illustrates an example of a device that performs charging or heats a heater by using power received from various types of external devices, according to an embodiment.

FIG. 6 illustrates an example of a device that performs charging or heats the heater 135 by using power received from various types of external devices 1000-1, 1000-2, and 1000-3, according to an embodiment.

Various types of the external device 1000 may be used to provide power to the device 100. For example, the device 100 may receive power from a computer 1000-1, an adaptor 1000-2, or a second battery 1000-3, or the like, but an embodiment is not limited thereto.

Also, the device 100 may receive power from the external device 1000 via a cable 200. Referring to FIG. 6, the cable 200 is illustrated as complying with USB standards, but this is only an example, and the present disclosure is not limited thereto. Cables according to other standards may also be used.

Figure 7:
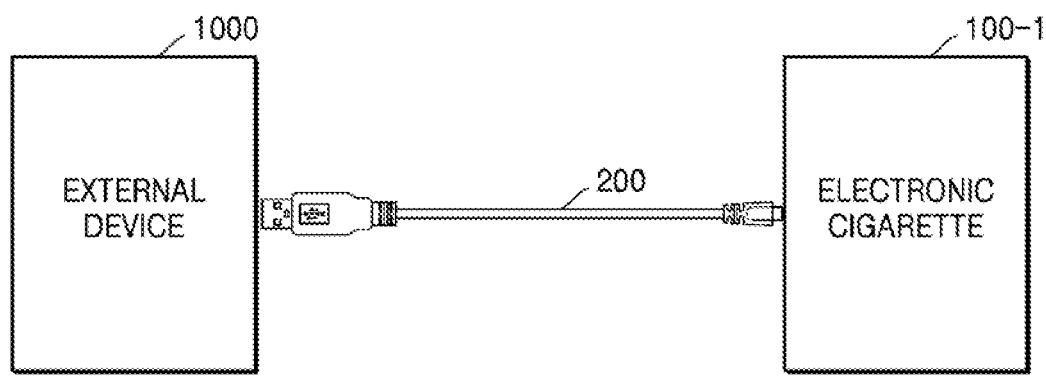
FIG. 7 illustrates an example in which an electronic cigarette, which is an example of a device, performs charging or heats a heater by using power received from an external device, according to an embodiment.

FIG. 7 illustrates an example in which an electronic cigarette 100-1, which is an example of the device 100, performs charging or heats the heater 135, by using power received from the external device 1000, according to an embodiment.

The electronic cigarette 100-1 is an example of the device 100. The electronic cigarette 100-1, which is an example of the device 100, may include the battery 120 and the heater 135, and may generate aerosol by heating the heater 135.

Figure 8:
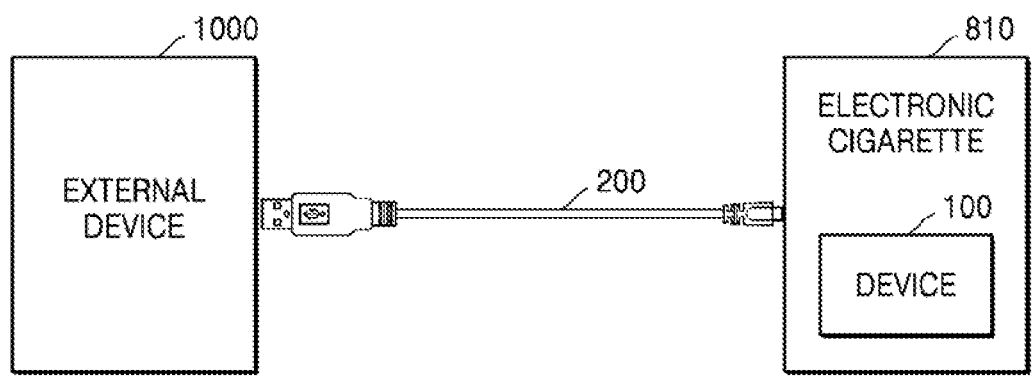
FIG. 8 illustrates an example of a device included in an electronic cigarette, according to an embodiment.

FIG. 8 illustrates an example of a device 100 included in an electronic cigarette 810, according to an embodiment.

Unlike FIG. 7, referring to FIG. 8, the device 100 may be included as a component of the electronic cigarette 810. For example, the device 100 including the battery 120 and the heater 135 may be implemented as a module in the electronic cigarette 810.

Figure 9:
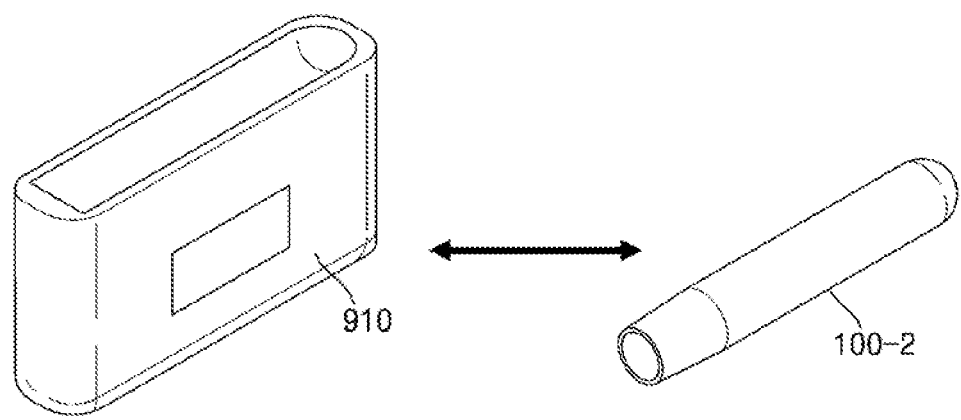
FIG. 9 illustrates an example in which a holder, which is an example of a device, performs charging or heats a heater by using power received from a cradle, according to an embodiment.

FIG. 9 illustrates an example in which a holder 100-2, which is an example of a device 100, performs charging or heats the heater 135, by using power received from a cradle 910, according to an embodiment.

The holder 100-2 is an example of the device 100. The holder 100-2, that is an example of the device 100, may include the battery 120 and the heater 135, and may generate aerosol by heating of the heater 135. Also, the holder 100-2 may receive power from the cradle 910. In this case, the cradle 910 may be an example of the external device 1000. The holder 100-2 may receive power from the cradle 910 in a wired or wireless manner.

Figure 10:
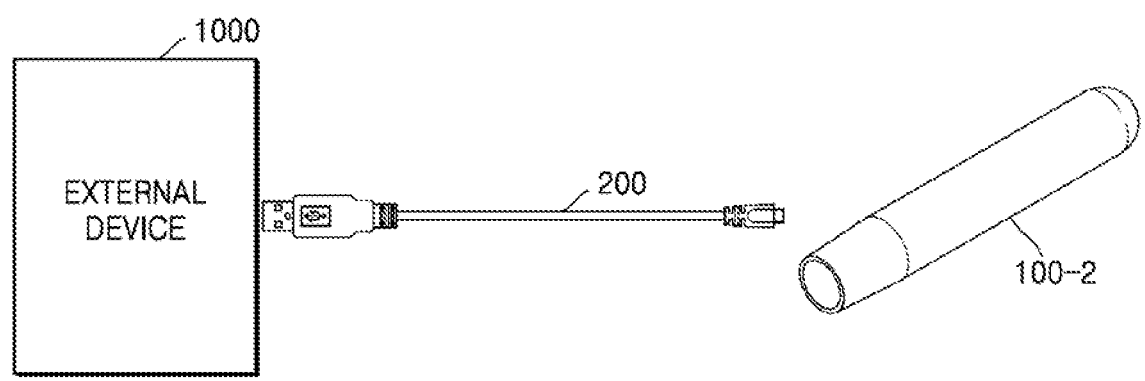
FIG. 10 illustrates an example in which a holder, which is an example of a device, performs charging or heats a heater by using power received from an external device, according to an embodiment.

FIG. 10 illustrates an example in which the holder 100-2, which is an example of the device 100, performs charging or heats the heater 135, by using power received from the external device 1000, according to an embodiment.

Unlike FIG. 9, referring to FIG. 10, the holder 100-2 does not have to receive power from the cradle 910, and may receive power from the external device 1000 other than the cradle 910. When the holder 100-2 receives power from the external device 1000, the cable 200 may be used, but the holder 100-22 may receive power also by using a preset contacting method or in a wireless manner.

Figure 11:
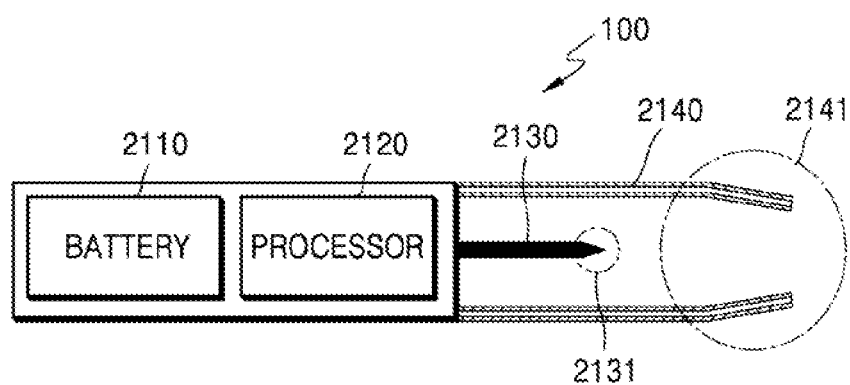
FIG. 11 illustrates an example of a device capable of generating aerosol, according to an embodiment.

FIG. 11 illustrates an example of a device capable of generating aerosol, according to an embodiment.

Referring to FIG. 11, a device 100 includes a battery 2110, a processor 2120, and a heater 2130. The device 100 also includes an inner space formed by a casing 2140. A cigarette may be inserted into the inner space of the device 100.

Only components associated with the present embodiment are shown in the device 100 shown in FIG. 11. Therefore, it will be understood by one of ordinary skill in the art that general components other than the components shown in FIG. 11 may be further included in the device 100.

When a cigarette is inserted into the device 100, the device 100 may heat the heater 2130. The temperature of an aerosol generating material in the cigarette is raised by the heated heater 2130, and thus aerosol is generated. The generated aerosol is delivered to a user through a cigarette filter. However, even when a cigarette is not inserted into the device 100, the device 100 may heat the heater 2130. For example, even when the cigarette is not inserted into the device 100, the device 100 may heat the heater 2130 for heating and cleaning for removing residue.

The casing 2140 may be detached from the device 100. For example, when a user rotates the casing 140 clockwise or counterclockwise, the casing 2140 may be detached from the device 100.

The diameter of a hole formed by a terminal end 2141 of the casing 2140 may be smaller than the diameter of a space formed by the casing 2140 and the heater 2130. In this case, the hole may serve as a guide for a cigarette inserted into the device 100.

The battery 2110 supplies power used for the device 100 to operate. For example, the battery 2110 may supply power for heating the heater 2130 and supply power for operating the processor 2120. In addition, the battery 2110 may supply power for operating a display, a sensor, a motor, and the like installed in the device 100.

The battery 2110 may be a lithium iron phosphate (LiFePO4) battery, but is not limited to the example described above. For example, the battery 2110 may be a lithium cobalt oxide (LiCoO2) battery, a lithium titanate battery, etc.

Also, the battery 2110 may have a cylindrical shape having a diameter of 10 mm and a length of 37 mm, but is not limited thereto. The capacity of the battery 2110 may be 120 mAh or more, and the battery 110 may be a rechargeable battery or a disposable battery. For example, when the battery 110 is rechargeable, the charging rate (C-rate) of the battery 110 may be 10C and the discharging rate (C-rate) may be 16C to 20C. However, the present disclosure is not limited thereto. Also, for stable use, the battery 110 may be manufactured, such that 80% or more of the total capacity may be ensured even when charging/discharging are performed 8000 times.

Here, it may be determined whether the battery 2110 is fully charged or completely discharged based on a level of power stored in the battery 2110 as compared to the entire capacity of the battery 2110. For example, when power stored in the battery 2110 is equal to or more than 95% of the total capacity, it may be determined that the battery 2110 is fully charged. Furthermore, when power stored in the battery 2110 is 10% or less of the total capacity, it may be determined that the battery 2110 is completely discharged. However, the criteria for determining whether the battery 2110 is fully charged or completely discharged are not limited to the above examples.

The heater 2130 may be heated by power supplied from the battery 2110. When a cigarette is inserted into the device 100, the heater 2130 may be located inside the cigarette. Therefore, the heated heater 2130 may raise the temperature of an aerosol generating material in the cigarette.

The shape of the heater 2130 may be a combination of a cylindrical shape and a conical shape. For example, the heater 2130 may be formed a cylindrical shape having a diameter of about 2 mm and a length of about 23 mm, and the end 2131 of the heater 2130 may be formed at an acute angle, but is not limited thereto. In other words, the heater 2130 may be applied without limitation as long as the heater 2130 may be inserted into the cigarette. In addition, only a portion of the heater 2130 may be heated. For example, assuming that the length of the heater 2130 is 23 mm, only 12 mm from the terminal end 2131 of the heater 2130 may be heated, and the remaining portion of the heater 2130 may not be heated.

The heater 2130 may be an electro-resistive heater. For example, the heater 2130 includes an electrically conductive track, and the heater 2130 may be heated as a current flows through the electrically conductive track.

For stable use, the heater 2130 may be supplied with power according to the specifications of 3.2 V, 2.4 A, and 8 W, but is not limited thereto. For example, when power is supplied to the heater 2130, the surface temperature of the heater 2130 may rise to 400° C. or higher. The surface temperature of the heater 2130 may rise to about 350° C. before 15 seconds after the power supply to the heater 2130 starts.

The device 100 may be provided with a separate temperature sensor. Alternatively, the device 100 may not be provided with a temperature sensing sensor, and the heater 2130 may serve as a temperature sensing sensor. For example, the heater 2130 may further include a second electrically conductive track for temperature sensing in addition to the first electrically conductive track for generating heat.

For example, when a voltage applied to the second electrically conductive track and a current flowing through the second electrically conductive track are measured, a resistance R may be determined. At this time, a temperature T of the second electrically conductive track may be determined by Equation 1 below.

$$R = R_0\{1 + \alpha(T - T_0)\} \qquad \text{[Equation 1]}$$

In Equation 1, R denotes a current resistance value of the second electrically conductive track, R0 denotes a resistance value at a temperature T0 (e.g., 0° C.), and a denotes a resistance temperature coefficient of the second electrically conductive track. Since conductive materials (e.g., metals) have inherent resistance temperature coefficients, α may be determined in advance according to a conductive material constituting the second electrically conductive track. Therefore, when the resistance R of the second electrically conductive track is determined, the temperature T of the second electrically conductive track may be calculated according to Equation 1.

The heater 130 may include at least one electrically conductive track (a first electrically conductive track and a second electrically conductive track). For example, the heater 130 may include, but is not limited to, two first electrically conductive tracks and one or two second electrically conductive tracks.

An electrically conductive track includes an electro-resistive material. For example, an electrically conductive track may include a metal. In another example, an electrically conductive track may include an electrically conductive ceramic material, a carbon, a metal alloy, or a composite of a ceramic material and a metal.

In addition, the device 100 may include both an electrically conductive track, which serves as a temperature sensing sensor, and a temperature sensing sensor.

The processor 2120 controls the overall operation of the device 100. Specifically, the processor 2120 controls not only operations of the battery 2110 and the heater 2130, but also operations of other components included in the device 100. The processor 2120 may also check the status of each of the components of the device 100 and determine whether the device 100 is in an operable state.

The processor 2120 includes at least one processor. A processor may be implemented as an array of a plurality of logic gates or may be implemented as a combination of a general purpose microprocessor and a memory in which a program executable in the microprocessor is stored. It will be understood by one of ordinary skill in the art that the present disclosure may be implemented in other forms of hardware.

For example, the processor 2120 may control the operation of the heater 2130. The processor 2120 may control an amount of power supplied to the heater 2130 and a time for supplying the power, such that the heater 2130 may be heated to a predetermined temperature or maintained at a proper temperature. The processor 2120 may also check the status of the battery 2110 (e.g., the remaining amount of the battery 2110) and generate a notification signal as occasions demand.

Also, the processor 2120 may check the presence or absence of a user's puff, check the strength of the puff, and count the number of puffs. Also, the processor 2120 may continuously check the time during which the device 100 is operating. The processor 2120 may also check whether a cradle to be described below is coupled with the device 100 and control the operation of the device 100 based on whether the cradle is coupled with or separated from and the device 100.

Meanwhile, the device 100 may further include general-purpose components other than the battery 2110, the processor 2120, and the heater 2130.

For example, the device 100 may include a display capable of outputting visual information or a motor for outputting tactile information. For example, when a display is included in the device 100, the processor 2120 may provide a user information about the state of the device 100 (e.g., availability of the holder, etc.), information about the heater 2130 (e.g., start of preheating, progress of preheating, completion of preheating, etc.), information about the battery 2110 (e.g., remaining power of the battery 2110, availability, etc.), information about resetting of the device 100 (e.g., reset timing, reset progress, reset completion, etc.), information about cleaning of the device 100 (e.g., cleaning timing, cleaning progress, cleaning completion, etc.), information about charging of the device 100 (e.g., need of charging, charging progress, charging completed, etc.), information about puff (e.g., the number of puffs, notification of expected completion of puffs, etc.), or information about safety (e.g., time of use, etc.) via the display. In another example, when a motor is included in the device 100, the processor 2120 may transmit the above-described information to a user by generating a vibration signal by using the motor.

The device 100 may also include a terminal coupled with at least one input device (e.g., a button) and/or the cradle through which a user may control the function of the device 100. For example, a user may perform various functions by using the input device of the device 100. By adjusting the number of times a user presses the input device (e.g., once, twice, etc.) or the time during which the input device is being pressed (e.g., 0.1 second, 0.2 second, etc.), a desired function from among a plurality of functions of the device 100 may be executed. As a user manipulates the input device, the device 100 may perform a function of preheating the heater 130, a function of regulating the temperature of the heater 2130, a function of cleaning the space in which a cigarette is inserted, a function of checking whether the battery 2110 is in an operable state, a function of displaying the remaining power (available power) of the battery 2110, a function of resetting the device 100, etc. However, the functions of the device 100 are not limited to the examples described above.

The device 100 may include a puff detection sensor, a temperature detection sensor, and/or a cigarette insertion detection sensor. For example, the puff detection sensor may be implemented by a general pressure sensor, the cigarette insertion detection sensor may be implemented by a general capacitive sensor or a general resistance sensor. In addition, the device 100 may be manufactured in a structure that an external air may be introduced/discharged even when the cigarette is inserted.

Figure 12:
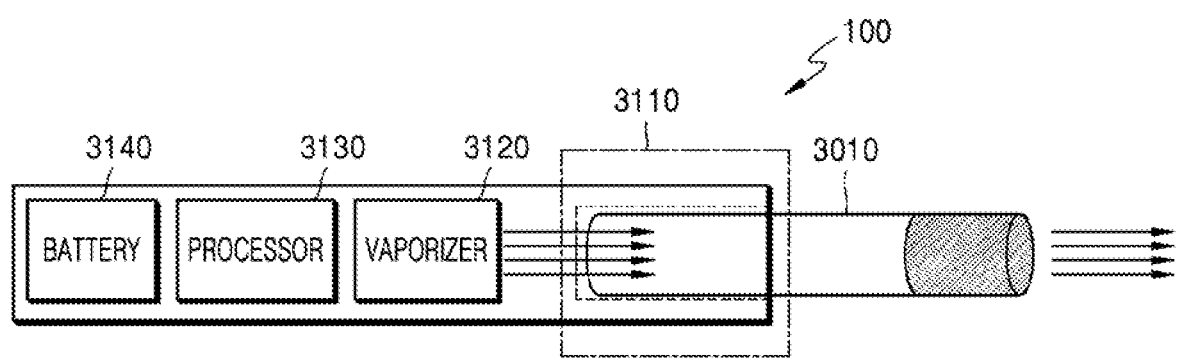
FIG. 12 illustrates an example of a device capable of generating aerosol through insertion of a cigarette, according to an embodiment.

FIG. 12 illustrates an example of a device capable of generating aerosol through insertion of a cigarette, according to an embodiment.

The device 100 may include a cigarette inserter 3110, a vaporizer 3120, a processor 3130, and a battery 3140. In the device 100 shown in FIG. 12, only components related to the present embodiment are shown. Therefore, it will be understood by those skilled in the art that other general purpose components other than the components shown in FIG. 12 may be further included in the device 100. In addition, the device 100 may be in the form of a stick and may be in the form of a holder.

The cigarette inserter 3110 corresponds to a region of one end of the device 100, and thus, according to an embodiment, the cigarette inserter 3110 may include a space into which a cigarette 10 may be inserted. According to an embodiment, the cigarette 3010 may have a shape of a general cigarette, as shown in FIG. 12. According to another embodiment, the cigarette 3010 may have a shape in which tobacco raw materials are wrapped in a heat conductive material.

The vaporizer 3120 may heat a liquid composition to generate aerosol and may discharge the generated aerosol through the inserted cigarette 3010 such that the generated aerosol passes through the cigarette 3010 inserted into the cigarette inserter 3110. Therefore, a tobacco flavor may be added to the aerosol that passed through the cigarette 3010, and a user may inhale the tobacco-flavored aerosol at one end of the cigarette 3010 by the mouth. According to an embodiment, the vaporizer 3120 may be referred to as a cartomizer or atomizer.

According to an embodiment, the cigarette inserter 3110 may include a heater module for heating the inserted cigarette 3010. The heater module may include a tubular heating element, a plate-shaped heating element, a needle- or rod-shaped heating element, and may heat the inside or the outside of the cigarette 3010 according to a shape of the heating element. The heater module may heat the cigarette 3010 to generate tobacco-flavored aerosol, and accordingly, the user may inhale the tobacco-flavored aerosol at one end of the cigarette 10 by the mouth. Accordingly, the user may inhale the aerosol generated by the vaporizer 3120 and the aerosol generated by heating the cigarette 3010 together. In addition, the heater module may heat the cigarette 3010 at a relatively low temperature (e.g., 40 degrees to 200 degrees).

According to another embodiment, the cigarette inserter 3110 may not include the heater module for heating the inserted cigarette 3010. In this case, the tobacco flavor may be added to the aerosol generated by the vaporizer 3120 even though the aerosol passes through the non-heated cigarette 3010. In particular, the taste-controlled cigarette 3010 may discharge a tobacco flavor ingredient by a contact with the ambient air or the aerosol. Thus, the user may inhale the tobacco-flavored aerosol from the non-heated cigarette 3010. In addition, because of the aerosol generated by heating of the vaporizer 3120, the user may inhale aerosol that is relatively warm from the non-heated cigarette 3010.

According to an embodiment, the vaporizer 3120 coupled to the device 100 may be replaceable.

The processor 3130 controls the overall operation of the device 100. Specifically, the processor 3130 controls operations of not only the battery 3140 and the vaporizer 3120 but also other components included in the device 100. In addition, the processor 3130 may check a state of each of the components of the device 100 to determine whether the device 100 is in an operable state.

The processor 3130 includes at least one processor. A processor may be implemented as an array of a plurality of logic gates or may be implemented as a combination of a general purpose microprocessor and a memory in which a program executable in the microprocessor is stored. It will be understood by one of ordinary skill in the art that the present disclosure may be implemented in other forms of hardware.

The battery 3140 supplies power used to operate the device 100. For example, the battery 3140 may supply current to the vaporizer 3120 such that the vaporizer 3120 may heat the liquid composition. In addition, the battery 3140 may supply power necessary for operating a display, a sensor, a motor, etc. installed in the device 100.

The battery 3140 may be a lithium iron phosphate (LiFePO4) battery, but is not limited thereto. For example, the battery 3140 may correspond to a lithium cobalt oxide (LiCoO2) battery, a lithium titantate battery, a lithium ion battery, etc.

The battery 3140 may have a cylindrical shape having a diameter of 10 mm and a length of 37 mm, but is not limited thereto. The capacity of the battery 3140 may range from 120 mAh to 250 mAh, but is not limited thereto. In addition, the battery 3140 may be a rechargeable battery or a disposable battery. For example, when the battery 3140 is rechargeable, a charging rate (C-rate) of the battery 140 may be 10C, a discharging rate (C-rate) may be 10C to 20C, but is not limited thereto. In addition, for stable use, the battery 3140 may be manufactured such that more than 80% of the total capacity may be secured even when charging/discharging is performed 2000 times.

Meanwhile, the device 100 may further include general purpose components in addition to the battery 3140, the processor 3130, and the vaporizer 3120.

For example, the device 100 may include a display capable of outputting visual information or a motor for outputting tactile information. As an example, when the display is included in the device 100, the processor 3130 may transmit information (e.g., whether the vaporizer 3120 is available) about a state of the vaporizer 3120, information (e.g., a preheating start, a preheating progress, a preheating completion, etc.) about the heater module, information (e.g., remaining capacity of the battery 3140, whether the battery 3140 is available, etc.) related to the battery 3140, information (e.g., a reset time, a reset progress, a reset completion, etc.) related to a reset of the device 100, information (e.g., a cleaning time, necessity of cleaning, a cleaning progress, a cleaning completion, etc.) related to cleaning of the device 100, information (e.g., necessity of charging, a charging progress, a charging completion, etc.) related to charging of the device 100, information (e.g., the strength of the puff etc.) related to a puff of the user, information (e.g. passing of a usage time, etc.) related to safety or the like, to the user through the display. As another example, when the motor is included in the device 100, the processor 3130 may generate a vibration signal by using the motor, thereby transmitting the above-described information to the user.

The device 100 may include a terminal coupled with at least one input device (e.g., a button) and/or the cradle through which a user may control the function of the device 100. For example, the user may perform various functions by using the input device of the device 100. By adjusting the number of times (e.g., once or twice) that the user presses the input device or a time (e.g., 0.1 second, 0.2 second, etc.) during which the user is pressing the input device, the user may perform a desired function among a plurality of functions of the device 100. As the user operates the input device, a function of preheating the heating element or the heater module of the vaporizer 3120, a function of adjusting a temperature of the heating element or the heater module of the vaporizer 3120, a function of cleaning a space in which a cigarette is inserted, a function of checking whether the device 100 is in an operable state, a function of displaying a remaining amount (available power) of the battery 3140, a reset function of the device 100, etc. may be performed. However, the function of the device 100 is not limited to the examples described above.

The device 100 may include a puff detection sensor, a temperature detection sensor, and/or a cigarette insertion detection sensor. In addition, the device 100 may be manufactured in a structure that an external air may be introduced/discharged even when the cigarette is inserted.

The above-described method can be written as computer programs executable on a computer and can be implemented in general-use digital computers that execute the programs using a computer-readable recording medium. Also, data structures used in the above-described method may be written to the computer-readable recording medium using various means. Examples of the computer-readable recording medium include magnetic storage media (e.g., ROM, RAM, USB, floppy disks, hard disks, etc.) and optical reading media (e.g., CD-ROMs or DVDs).

It will be understood by those skilled in the art that various changes in form and details may be made therein without departing from the spirit and scope of the present disclosure. Thus, the disclosed methods should be considered in descriptive sense only and not for purposes of limitation. The scope of the present disclosure is defined not by the detailed description of the present disclosure but by the appended claims, and all differences within the scope will be construed as being included in the present disclosure.

What is claimed is:

1. A device comprising: a processor
    a receiving terminal configured to receive power from an external device;
    a first path configured to supply a portion of the power received from the external device to a battery included in the device such that the battery is charged; and
    a second path configured to supply a portion of the power received from the external device directly to a module included in the device without charging the battery, wherein the module comprises a heater configured to perform heated cleaning by using the power received via the second path, and
    wherein the processor is configured to control supply of the power received from the external device, such that charging of the battery and heating of the heater are simultaneously performed.

2. The device of claim 1, wherein an amount of power consumed by the module per unit time is equal to or greater than a preset value.

3. The device of claim 1, wherein the processor blocks a third path used in supplying power from the battery to the heater while supplying power to the battery.

* * * * *